No. 721,557. PATENTED FEB. 24, 1903.
C. W. GAY.
PAPER BOX MACHINE.
APPLICATION FILED JULY 28, 1902.
NO MODEL. 6 SHEETS—SHEET 1.

Witnesses:

Inventor:
Chauncey W. Gay
By his Attorney

No. 721,557. PATENTED FEB. 24, 1903.
C. W. GAY.
PAPER BOX MACHINE.
APPLICATION FILED JULY 28, 1902.
NO MODEL. 6 SHEETS—SHEET 2.

No. 721,557. PATENTED FEB. 24, 1903.
C. W. GAY.
PAPER BOX MACHINE.
APPLICATION FILED JULY 28, 1902.
NO MODEL. 6 SHEETS—SHEET 3.

Witnesses:
Chas. F. Schmely
J. W. Garfield

Inventor:
Chauncey W. Gay
By his Attorney
Wm. F. Bellows

No. 721,557. PATENTED FEB. 24, 1903.
C. W. GAY.
PAPER BOX MACHINE.
APPLICATION FILED JULY 28, 1902.
NO MODEL. 6 SHEETS—SHEET 4.

Witnesses: Inventor:
Chauncey W. Gay
By his Attorney

No. 721,557. PATENTED FEB. 24, 1903.
C. W. GAY.
PAPER BOX MACHINE.
APPLICATION FILED JULY 28, 1902.
NO MODEL. 6 SHEETS—SHEET 5.

Witnesses:
Chas. F. Schmelz
J. W. Garfield

Inventor:
Chauncey W. Gay
By his Attorney
Wm. F. Bellows

No. 721,557. PATENTED FEB. 24, 1903.
C. W. GAY.
PAPER BOX MACHINE.
APPLICATION FILED JULY 28, 1902.
NO MODEL. 6 SHEETS—SHEET 6.

Witnesses:
Inventor:
Chauncey W. Gay
By his Attorney

UNITED STATES PATENT OFFICE.

CHAUNCEY W. GAY, OF WEST SPRINGFIELD, MASSACHUSETTS.

PAPER-BOX MACHINE.

SPECIFICATION forming part of Letters Patent No. 721,557, dated February 24, 1903.

Application filed July 28, 1902. Serial No. 117,245. (No model.)

*To all whom it may concern:*

Be it known that I, CHAUNCEY W. GAY, a citizen of the United States of America, and a resident of West Springfield, in the county of Hampden and State of Massachusetts, have invented certain new and useful Improvements in Paper-Box Machines, of which the following is a full, clear, and exact description.

This invention relates to machines for making rectangular tubular boxes, lined with paraffined paper or similar material, so as to render the receptacle moisture-proof; and my invention has for one of its objects the provision of a machine whereby the several box forming and lining operations are systematically carried out.

My invention has, furthermore, for its object the provision of means whereby suitable reading matter, &c., may be printed on the outer surface of the box-blank and the combination therewith of a web of paper, which is fed through the machine and is cut into lengths corresponding to the boxes, so as to prevent offset of the fresh ink, this paper being interposed between the box-blanks and separated simultaneously therewith.

Further objects of my invention may be found in the improved construction and organization of some of the coöperating elements, as will be hereinafter described and as is illustrated in the accompanying drawings, in which similar characters denote similar parts, and in which—

Figure 1:
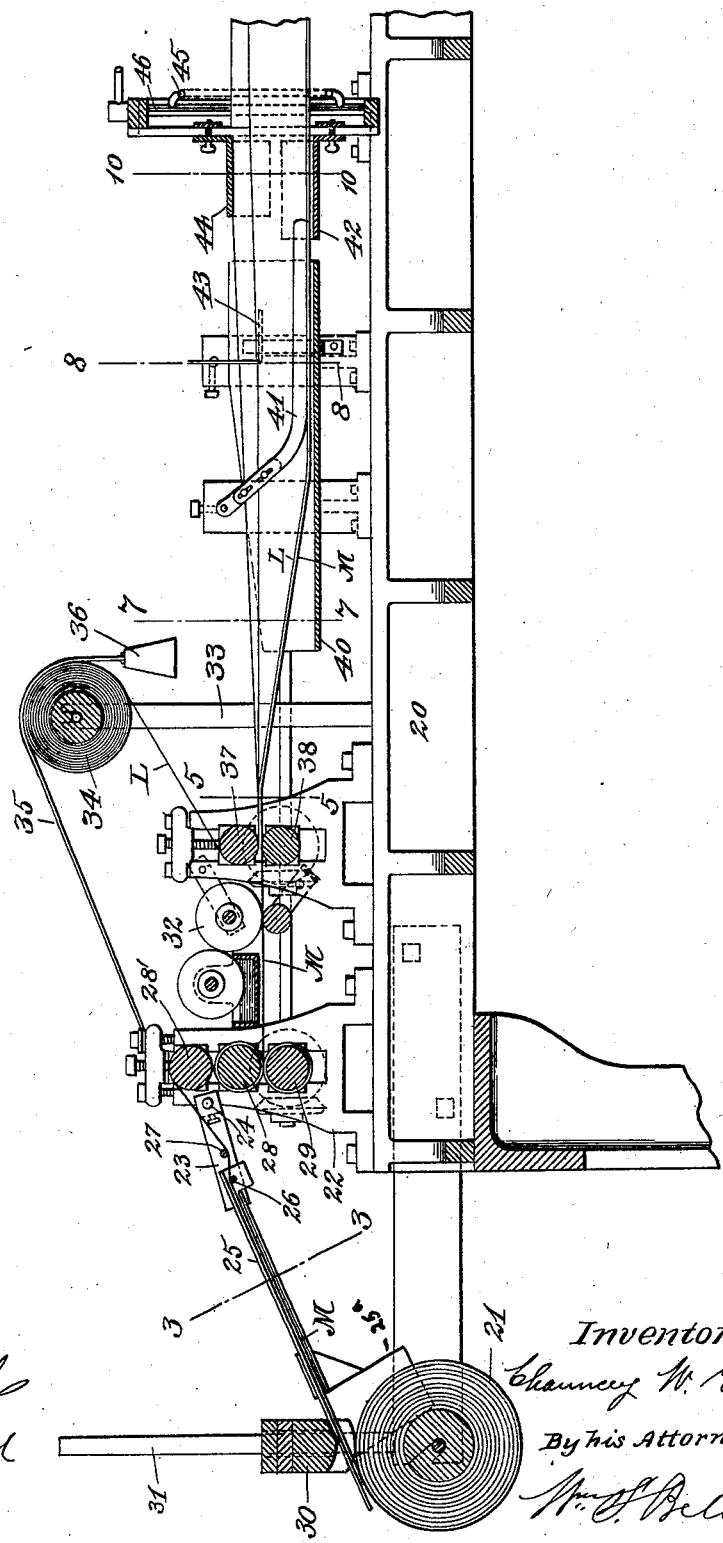
Figure 2:
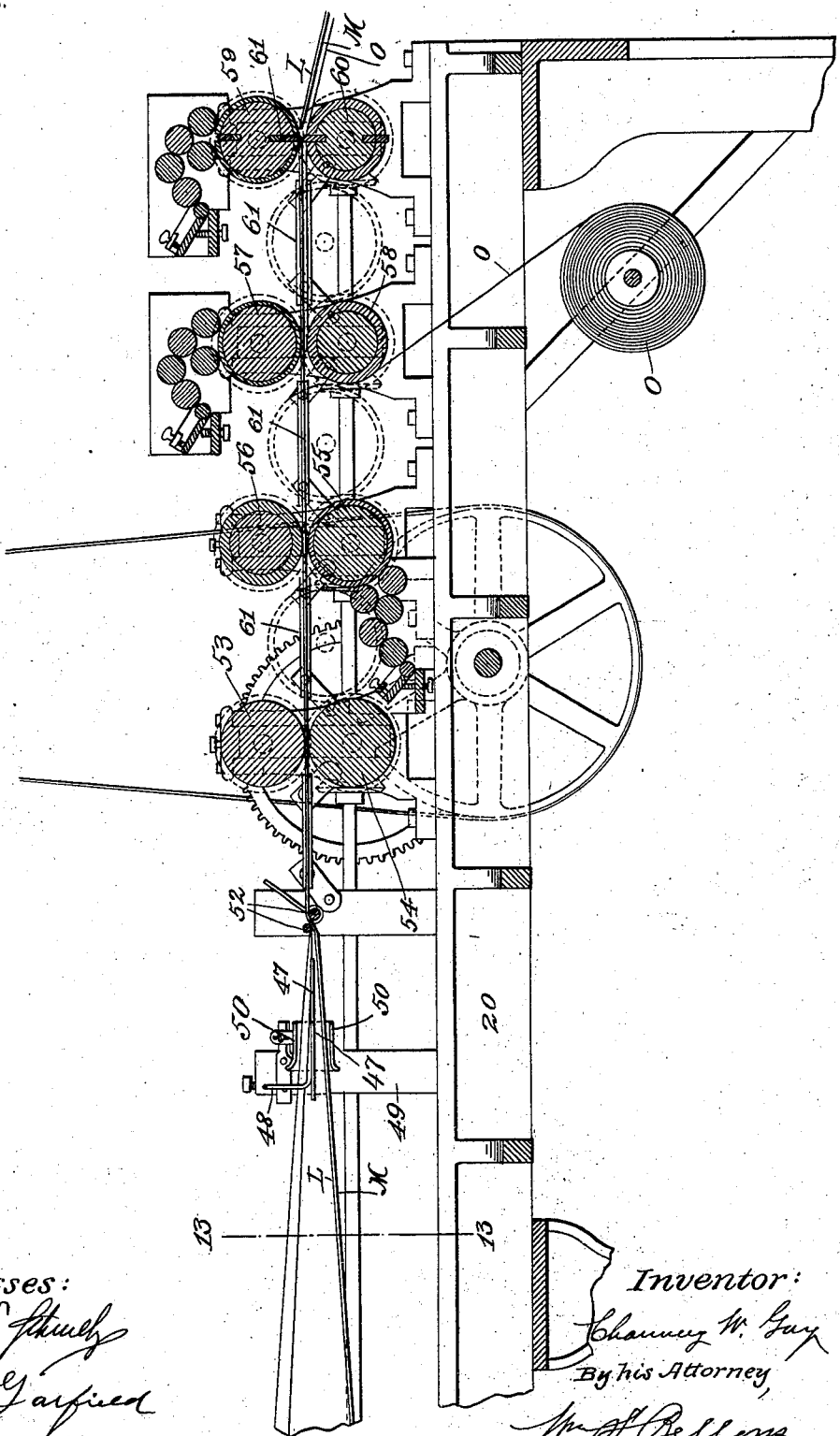
Figure 3:
Figure 4:
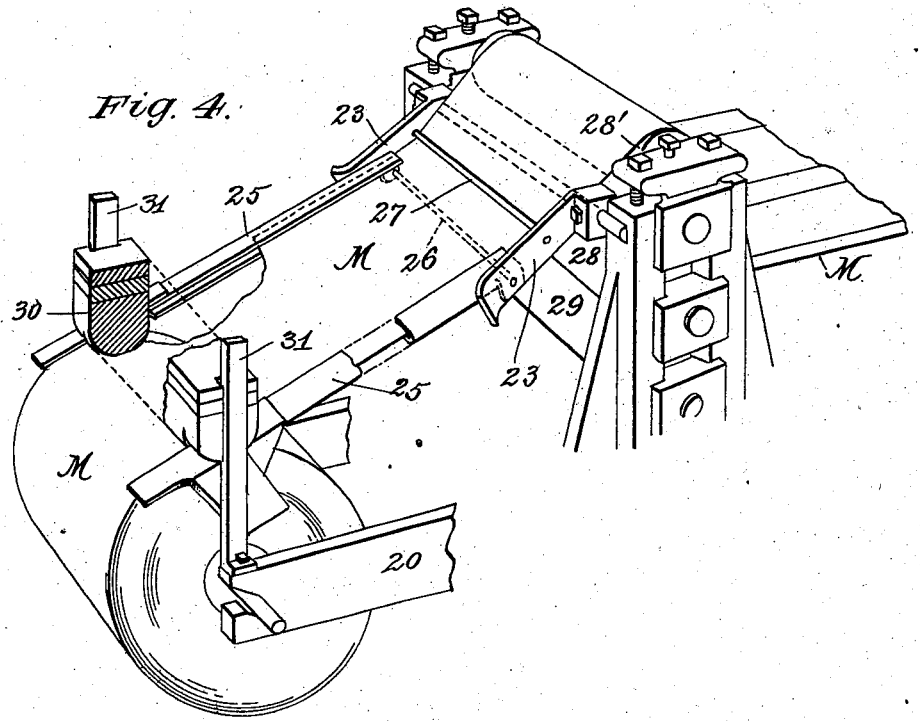
Figure 5:
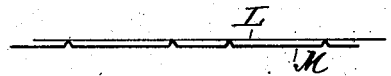
Figure 6:
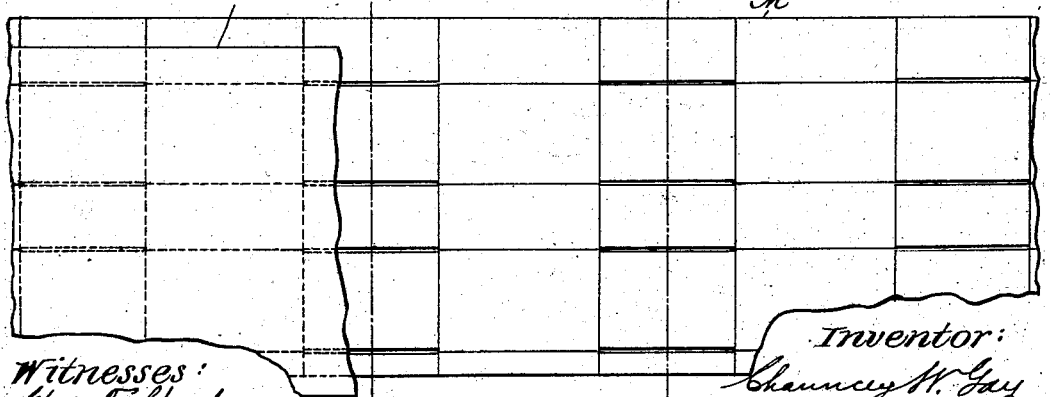
Figure 7:
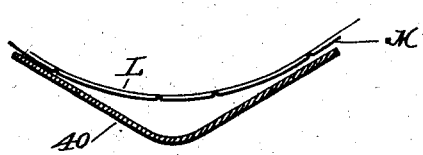
Figure 8:
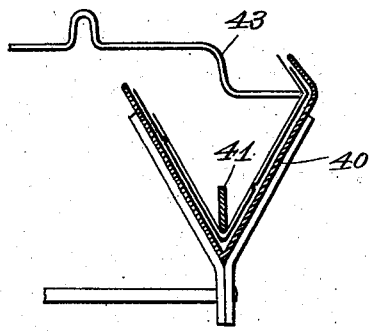
Figure 9:
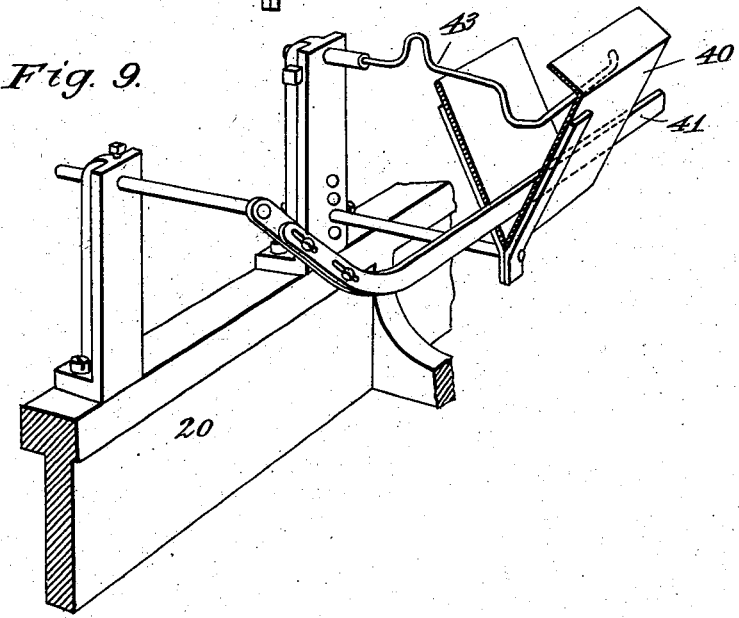
Figure 10:
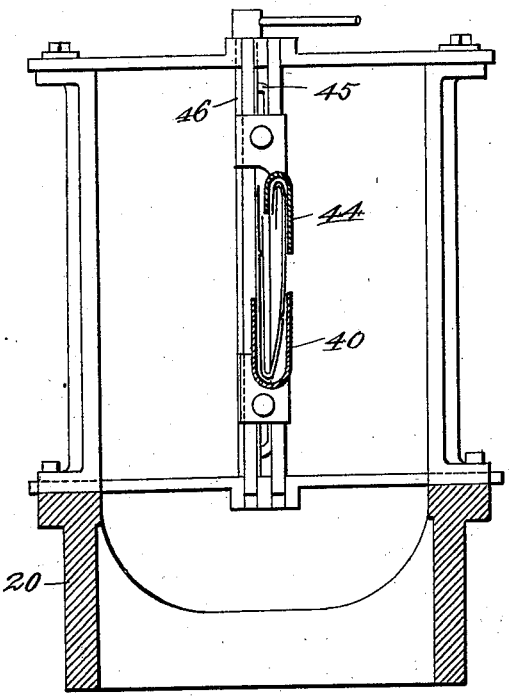
Figure 11:
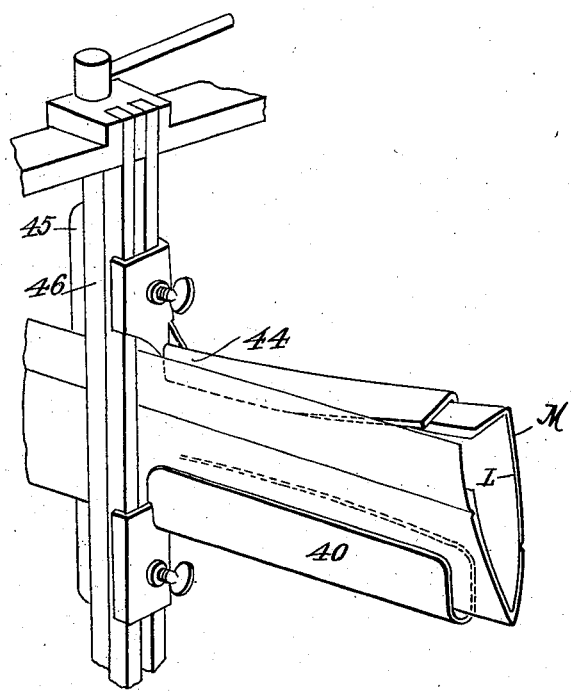
Figure 12:
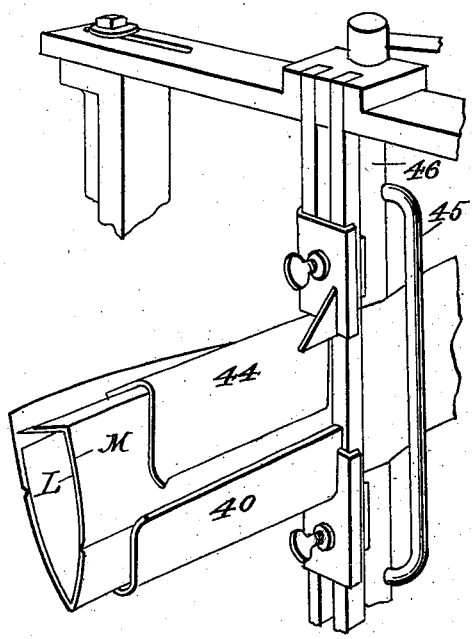
Figure 13:
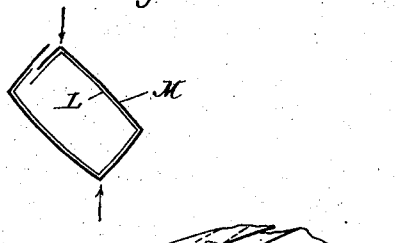
Figure 14:
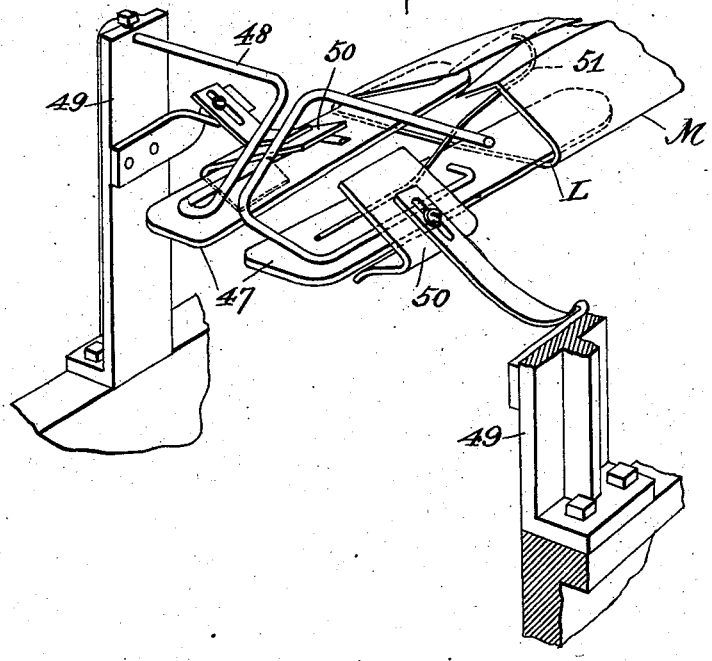
Figure 15:
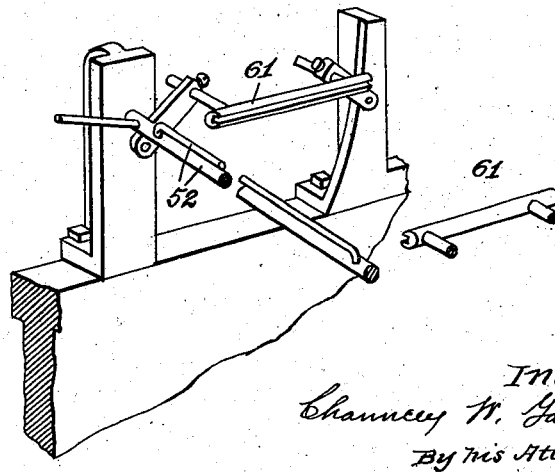

Figures 1 and 2 together represent a longitudinal section of my improved machine. Fig. 3 shows a cross-section on line 3 3 of Fig. 1. Fig. 4 is a perspective view of the front end of the machine, illustrating the manner in which the paper from which the boxes are to be formed is entered and fed into the machine. Fig. 5 is a cross-section on line 5 5 of Fig. 1. Fig. 6 illustrates a plan view of a strip of paper, showing the manner in which it is scored and cut, the fine single lines representing the scores and the heavier double lines indicating the cut or slotted portion. Fig. 7 is a cross-section on line 7 7 of Fig. 1. Fig. 8 shows a cross-section on line 8 8 of Fig. 1. Fig. 9 is a perspective view of that portion of the machine located between the lines 7 and 8 shown in Fig. 1. Fig. 10 is a cross-section on line 10 10 of Fig. 1. Figs. 11 and 12 illustrate in perspective views the blank-folding members whereby the blank is creased on the score-lines, together with the lining. Fig. 13 is a cross-section on line 13 13 of Fig. 2. Fig. 14 is a perspective view of the blank-flattening device preparatory to subjecting the blank to the compressing members whereby the gummed loose ends of the blank are caused to adhere to each other; and Fig. 15 is a perspective showing the tensioning device for the blank-strip and the transfer-guide for supporting said strip during its passage between the printing-couples.

The present machine is an improvement on the box-machine shown and described in Letters Patent No. 695,301, granted to C. W. Gay, and also on that shown in Patent No. 695,369, granted to A. Birnie and C. W. Gay, both patents bearing date of March 11, 1902, and inasmuch as the particular box which is to be formed by my improved machine has been fully described in the patents above named, I do not deem it necessary to describe the general construction of the machine.

In the drawings, 20 represents a suitable framework supporting at one end a supply-web roll 21 of cardboard or similar material from which the body of the box is to be made. Supported by standards 22 near the initial end of the machine, but forward of the support for the supply-web roll, are a pair of arms 23, which are adjustable crosswise of the machine on a stationary rod 24 and may be held fixed in any of their more or less separated positions and in rearward extension from said supporting-rod by the confining-screws shown in Figs. 1 and 4. Pivotally supported at the extremities of said arms 23 are guides 25, preferably trough-shaped in cross-section, but essentially comprising separated members one above the other to engage above and below the running web, at the marginal portions thereof, for guiding the same over a tension-rod 26 and under another tension-rod 27 to a running-course over a tension-roll 28', which is supported in adjustable journals within the uprights 22. Directly under the said tension-roll, parallel therewith, are the pair of slitting and scoring rolls 28 and 29, said tension-roll 28' being so close to the periphery of one of the rolls of said pair 28 29 as to bind the supply-web, which passes around the roll 28' and between it and the one of such pair of rolls before the web has a half-encircling disposition around the roll 28 in its forward passage through and between and subject to the slitting and scoring action of the rolls 28 and 29, and such pair of slitting and creasing rolls 28 and 29, it will be understood, may advantageously be of substantially the same form and construction as those shown and described in the aforementioned patent. It will be particularly perceived that the roll 28' has its location axially removed from the direct line extended from the periphery of the web-supply roll to the line of the meeting peripheral portions of the said scoring and slitting rolls 28 and 29, whereby the course of the web running from the supply-roll to and between and subject to the scoring and slitting action of the said pair of rolls 28 29 must be one almost entirely encircling the top roll 28' and half encircling the roll 28 in or almost in contact against and under the tension-roll, so that the web is absolutely held firmly and without any possibility of slipping or becoming slackened at the place or line in the machine at which the carton-producing operations may be considered as having their beginning, and the web will be forwardly drawn, against the resistance of the reliable character as insured by the arrangement above described and explained, by the draft action of the cylinders or rolls 53 to 60, one or more, as provision thereof is made, which latter-mentioned draft mechanism, as hereinafter pointed out, is comprised in the printing and cutting-off arrangements.

In order to efficiently friction the web-roll 21 while the web is being withdrawn therefrom, flat rearward extensions of the guide-strips 25 are preferably arranged to rest upon the web-roll, a weight or weights of transversely-extended bar form, such as shown at 30, being provided and vertically guided between uprights 31, such weight bar or bars having bearing on the free extremities of the guide-strips. After the web has passed the scoring and slitting rolls a narrow strip of paste or gum may be supplied thereto by the gumming mechanism, indicated herein by 32.

Journaled in uprights 33 is a web-roll 34, of lining-paper, which may be of any suitable species and which may be frictioned by a strap 35, pulled into contact with said roll by a weight 36, as shown in Fig. 1. The lining-web L is carried over a roller 37, adjacent to a roller 38 and coöperative therewith, for bringing the lining-web L and the main web M into close contact with each other, but in such a manner that the edges of the webs overlap each other, substantially as shown in Fig. 5, so that the paste which is laid upon the edge of the main web M will remain untouched for the time being. Both webs M and L are now conducted into a trough 40, substantially V-shaped in cross-section, the webs being folded on the longitudinal central score-line and substantially as illustrated in Figs. 7 and 8, and in order to insure the webs being folded in the proper manner means are provided whereby the central portion of the webs is drawn or forced into the bottom of the trough 40, these means consisting substantially of a creaser-finger 41. (See Figs. 8 and 9.) From this folded trough 40 the webs are conducted to another trough 42, the sides of which are more closely drawn together at the top, one of said sides being, furthermore, bent over, substantially as shown in Fig. 10, whereby the flat end of the box-blank is folded on its score-line preparatory to being brought into contact with the pasted side thereof.

Since the upper end of the box-blank during its passage from the trough 40 to the trough 42 tends to bend the flap inward without creasing the same, means are provided whereby the web is maintained in spread condition during the formation of the bottom fold, these means consisting substantially of a top-fold finger 43, (see Fig. 9,) over which the flap will be bent without danger of striking the gummed side of the box.

After the flap has been primarily bent in the manner above described it is still further bent over or creased into the required condition by a top-fold former, such as 44, clearly shown in Figs. 1 and 10. The web is now passed to a device whereby the gummed blank-flap is caused to contact with the plain blank-side, so as to deposit a part of the gum-supply thereon, this device being preferably in the nature of a rod 45, bent at its ends and secured to a vertically-disposed shaft 46, which may be rotated until the required degree of bend, and at the same time tension, will have been obtained, the web passing between the shaft 46 and the rod 45, so that according to the position of the latter relative to the former the web will be in more or less tight contact with the rod, thus tensioning the web and at the same time folding the upper flap of the same.

From the above it will be understood that in reality a part of the gum-supply on the edge of the blank-web will be deposited upon the flap side.

Now it has been found in practice that it is of material benefit in the operation of forming a box of this character that the flap end shall be again separated from the main web after a part of the gum-supply has been deposited thereon, this action resulting in permitting the gum to "set" to a greater or less extent and according to the duration of time with which the gum is exposed to the air. Hence the web is now ready to be collapsed by distending the sides thereof, which action will result in bringing the vertically-opposite creases or corners of the box-blank toward each other and in the direction shown by arrows in Fig. 13. The device whereby this collapsing action is effected is clearly shown in Fig. 14, in which 47 denotes a pair of horizontally-disposed spreaders, which constitute supports for the blank-corners and which may be supported in any suitable manner—as, for instance, by wires 48, adjustably supported in uprights 49.

In order to insure the corners being fully creased at their respective score-lines, corner-flatteners, such as 50, may be provided for cooperation with the flatteners 47 and may be made subject to suitable adjustment relative thereto in any desired manner.

Means are provided for supporting the gum flap in proper position relative to the blank-body during the collapsing thereof, these means being herein shown as a wire 51, disposed below the flap portion of the blank, as shown in Fig. 14, so that as the web is gradually more and more collapsed the flap will be prevented from striking the lower portion with its edge, and, furthermore, will come in proper position to recontact with the gum of the blank-body, the web being drawn through a tension, or what might be more properly termed a "contacting," device 52, the construction of which is substantially similar to the tension device 44 and 45, above described, and which is, however, horizontally disposed instead of vertically. The box-blank is now practically complete and in a horizontal plane, so that it may now be passed to a mechanism whereby the collapsed blank-strip may be firmly compressed. This mechanism comprises in the present instance a pair of coacting presser-rolls 53 and 54, disposed at opposite sides of the web, respectively, and serving to force the gummed surfaces together, thus forming what may now be termed a "blank-strip," which may then be conducted to a printing mechanism comprising a printing-roller and an impression-roller 55 and 56, respectively, whereby any suitable reading matter may be printed upon the outside of the blank.

While the printing mechanism just described is operative only on the under side of a blank, (see Fig. 2,) similar printing-couples may be disposed above the blank-strip, so as to imprint the outer side of the blank-strip as desired, each of the impression-rollers being preferably covered with rubber, so that any inequality of thickness of the blank-strip will not be detrimental to the production of a uniform and clear print.

In Fig. 2 I have illustrated printing-cylinders 57 and 58 for printing the upper surface of the blank-strip, while impression-rollers 58 and 60 are disposed below the said strip, and means are provided whereby the blank-strip may be supported and guided between the several sets of rollers, these means being formed substantially as of grooved guides 61, engaging the opposite edges of the blank-strip and the construction of which may be seen clearly in Fig. 15.

As above mentioned my invention has for one of its objects the provision of a web of paper which is fed through the machine in connection with the main and lining webs, so as to prevent offset of the fresh ink, and in Fig. 2 I have illustrated a roll of paper O, which is laid over the impression-roll 58 and from this point onward moves in unison with the blank-strip, so that the fresh ink deposited by the roller 55 on the under side of said strip will not be deposited on either of the impression-rollers 58 or 60, above mentioned. This offset-web accompanies the blank-strip through a cutting device 61, whereby the blank-strip is cut into box lengths and which is preferably organized in connection with the last set of printing-couples 59 and 60, above referred to. As the blank-strip is cut to form box lengths the offset paper is cut off simultaneously therewith and will be deposited between the cut box-blanks as the latter are discharged from the machine. The opposite parallel cross-sectionally trough-shaped guide-strips pivotally hung to the extremities of the bracket-like arms 23 have provided at the extremities thereof, which are in bearing on and adjacent the top of the web or roll 21, and which extremities, as indicated in Fig. 1, are each in the form of a single strip corresponding to the upper leaf or section of the guide-strip, such strip not being continued in the full trough form entirely to the end, the depending side plates or cheek members 25ª, which extend down coincident with the planes of the ends of the supply-roll and have restraining bearings thereagainst, so that the guide-strips can have no tendency to any transverse or twisting displacement, but, on the other hand, so that the strip will at all times be constrained in its running course to move accurately and strictly at right angles to the axis of the aforementioned tension-roll 28', and the web being truly and squarely brought to this tension-roll is by the coöperation which this roll has not only with the guiding and squaring device which has been particularly described, but with the scoring and slitting rolls 28 and 29, which are next to and directly under said tension-roll 28', always caused to have its forward feeding movement in positive uniformity with the draft or feeding of and printing contact on the completed carton-tube at the farther end of the machine by the printing-cylinders and impression-rolls thereof, so that by the avoidance of any slackening, slipping, or lost motion at the initial end of the machine the printing may be performed in perfect registry, and the cross-cutting of the tube into separate cartons may be exactly midway of the length of the longitudinal slits formed in the tube by the scoring and slitting rolls.

Having thus described my invention, what I claim as new, and desire to secure by Letters Patent, is—

1. In a carton-making machine the combination with a support for a web-supply roll and a pair of slitting, or scoring rolls, of a pair of pivotally-mounted guiding-strips for the web having upper and lower portions for engagement at the opposite sides of the margins of the web running from the supply to said scoring rolls, and said strips being arranged to have bearings peripherally on the supply-roll, and a tension-roll having a location removed from the direct line between the web-supply roll and the peripherally adjoining portions of said pair of rolls, and said tension-roll having close peripheral proximity to one of the rolls of said pair.

2. In a carton-making machine, the combination with a support for a web-supply roll and a pair of slitting or scoring rolls, of a pair of pivotally-mounted guiding-strips for the web having upper and lower portions for engagement at the opposite sides of the margins of the web running from the supply-roll to said scoring-rolls and said strips being arranged to have bearings peripherally on the supply-roll, a weight-bar extending between the free extremities of said pivoted guiding-rolls, and a tension-roll having a location removed from the direct line between the web-supply roll and the adjoining portions of said pair of rolls, which latter roll peripherally adjoins one of the rolls of said pair.

3. In a carton-making machine the combination with a support for a web-supply roll and a pair of slitting or scoring rolls, of a pair of pivotally-mounted guiding-strips for the web having upper and lower portions for engagement at the opposite sides of the margins of the web running from the supply to said scoring rolls, said strips being arranged to have bearings peripherally on the supply-roll, and being provided with angularly-extending members $25^a$ adapted to engage the ends of the supply-roll, and a tension-roll having a location removed from the direct line between the web-supply roll and the adjoining portions of said pair of rolls, which latter roll peripherally adjoins one of the rolls of said pair.

4. The combination with a support for a web-supply roll, and supporting-uprights having journaled therein a pair of slitting and scoring rolls 28 29 and also above the upper one of said rolls and in close proximity thereto, the tension-roll 28', of the bracket-arms, supported by and rearwardly extended from said uprights, and having the trough-shaped guide-strips 25 25 pivoted thereto, said guide-strips having extensions arranged for bearings against the top of the supply-roll.

5. The combination, with a web; scoring-roll; and means for supplying a lining-web; of a trough for receiving both the supply and lining webs; a creaser-finger disposed in said trough and for folding said webs on the longitudinal central score-line; a top-fold finger for maintaining the web in distended condition during the formation of the bottom fold; and a top-fold former for creasing the blank at the flap score-line.

6. The combination, with web-scoring roll; a folding mechanism and means for supplying paste to the web; of a device for causing the gummed blank-flap to contact with the plain blank side, and to deposit a part of the gum-supply thereon; means for separating the gummed flap from the blank-body subsequent to its contact therewith; and means for collapsing the blank to cause recontact of the gummed flap with the blank-body.

7. The combination, with web-scoring roll; a folding mechanism and means for supplying paste to the web; of a device for causing the gummed blank-flap to contact with the plain blank side, and to deposit a part of the gum-supply thereon; means for separating the gummed flap from the blank-body subsequent to its contact therewith; means for collapsing the blank to cause recontact of the gummed flap with the blank-body; blank-corner supports; and corner-flatteners coöperative therewith.

8. The combination, with web-scoring roll; a folding mechanism and means for supplying paste to the web; of a device for causing the gummed blank-flap to contact with the plain blank side, and to deposit a part of the gum-supply thereon; means for separating the gummed flap from the blank-body subsequent to its contact therewith; means for collapsing the blank to cause recontact of the gummed flap with the blank-body; a device for supporting the gummed flap in proper position relative to the body during the collapsing of the blank; and a blank-strip-tensioning device.

9. The combination, with web-scoring roll; a folding mechanism and means for supplying paste to the web; of a device for causing the gummed blank-flap to contact with the plain blank side, and to deposit a part of the gum-supply thereon; means for separating the gummed flap from the blank-body subsequent to its contact therewith; means for collapsing the blank to cause recontact of the gummed flap with the blank-body; a device for supporting the gummed flap in proper position relative to the body during the collapsing of the blank; a blank-strip-tensioning device; and means for varying the tension of the blank-strip.

10. The combination, with web-scoring roll; a folding mechanism and means for supplying paste to the web; of a device for causing the gummed blank-flap to contact with the plain blank side, and to deposit a part of the gum-supply thereon; means for separating the gummed flap from the blank-body subsequent to its contact therewith; and means for collapsing the blank to cause recontact of the gummed flap with the blank-body; a device for supporting the gummed flap in proper position relative to the body during the collapsing of the blank; and means for compressing the collapsed blank-strip.

11. The combination, with web-scoring roll; a folding mechanism and means for supplying paste to the web; of a device for causing the gummed blank-flap to contact with the plain blank side, and to deposit a part of the gum-supply thereon; means for separating the gummed flap from the blank-body subsequent to its contact therewith; means for collapsing the blank to cause recontact of the gummed flap with the blank-body; a device for supporting the gummed flap in proper position relative to the body during the collapsing of the blank; means for compressing the collapsed blank-strip; and a printing mechanism operative on the blank-strip.

12. The combination, with web-scoring roll; a folding mechanism and means for supplying paste to the web; of a device for causing the gummed flap to contact with the plain blank side, and to deposit a part of the gum-supply thereon; means for separating the gummed flap from the blank-body subsequent to its contact therewith; means for collapsing the blank to cause recontact of the gummed flap with the blank-body; a device for supporting the gummed flap in proper position relative to the body during the collapsing of the blank; means for compressing the collapsed blank-strip; and printing mechanisms disposed at opposite sides of the blank-strip.

13. The combination, with web-scoring roll; a folding mechanism and means for supplying paste to the web; of a device for causing the gummed blank-flap to contact with the plain blank side, and to deposit a part of the gum-supply thereon; means for separating the gummed flap from the blank-body subsequent to its contact therewith; means for collapsing the blank to cause recontact of the gummed flap with the blank-body; a device for supporting the gummed flap in proper position relative to the body during the collapsing of the blank; means for varying the tension of the blank-strip; a printing mechanism operative on the blank-strip; and means for supporting and guiding the blank-strip between the several sets of rolls.

14. The combination, with a printing mechanism operative on the blank-strip; of means for supplying an offset-web; means for carrying said offset-web in unison with the blank-strip; and a cutting device for separating the strip into box lengths, and for simultaneously cutting off the offset-web in similar lengths preparatory to the discharge thereof from the machine.

15. The combination, with a printing mechanism disposed at opposite sides of the blank-strip; of means for supplying an offset-web; means for carrying said offset-web in unison with the blank-strip; and a cutting device for cutting the strip into box lengths, and for depositing lengths of the offset-web between the box-blanks.

Signed by me at Springfield, Massachusetts, in presence of two subscribing witnesses.

CHAUNCEY W. GAY.

Witnesses:
WM. S. BELLOWS,
A. V. LEAHY.